(12) United States Patent
Duan et al.

(10) Patent No.: US 11,716,231 B1
(45) Date of Patent: Aug. 1, 2023

(54) WAVEFORM DESIGNS FOR JCS IN NTN SYSTEMS

(71) Applicant: QUALCOMM Incorporated, San Diego, CA (US)

(72) Inventors: Weimin Duan, San Diego, CA (US); Jun Ma, San Diego, CA (US); Huilin Xu, Temecula, CA (US); Qiang Wu, San Diego, CA (US); Lianghai Ji, San Diego, CA (US); Mehmet Izzet Gurelli, San Diego, CA (US); Karthik Anantha Swamy, La Jolla, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/822,057

(22) Filed: Aug. 24, 2022

(51) Int. Cl.
| | |
|---|---|
| *H04L 27/26* | (2006.01) |
| *H04L 5/00* | (2006.01) |
| *H04W 8/22* | (2009.01) |
| *H04B 7/185* | (2006.01) |

(52) U.S. Cl.
CPC ........ *H04L 27/26025* (2021.01); *H04L 5/005* (2013.01); *H04L 5/0007* (2013.01); *H04W 8/22* (2013.01); *H04B 7/18523* (2013.01)

(58) Field of Classification Search
CPC . H04L 27/26025; H04L 5/0007; H04L 5/005; H04L 8/22
See application file for complete search history.

(56) References Cited

U.S. PATENT DOCUMENTS

2021/0029658 A1* 1/2021 Mahalingam ...... H04B 7/18513

* cited by examiner

*Primary Examiner* — Curtis B Odom
(74) *Attorney, Agent, or Firm* — Weaver Austin Villeneuve & Sampson LLP/QUALCOMM

(57) ABSTRACT

In some implementations, a non-terrestrial network (NTN) platform may transmit radio frequency (RF) signals toward earth, the RF signals comprising an orthogonal frequency-division multiplexing (OFDM) waveform with a plurality of symbols including a JCS symbol and one or more non-JCS symbols, wherein: the RF signals are incident on an area of the earth defining a footprint, and a duration of a cyclic prefix (CP) of the JCS symbol is a function of a width of the footprint. The NTN platform may receive, at the NTN platform, one or more reflections of the JCS symbol.

30 Claims, 12 Drawing Sheets

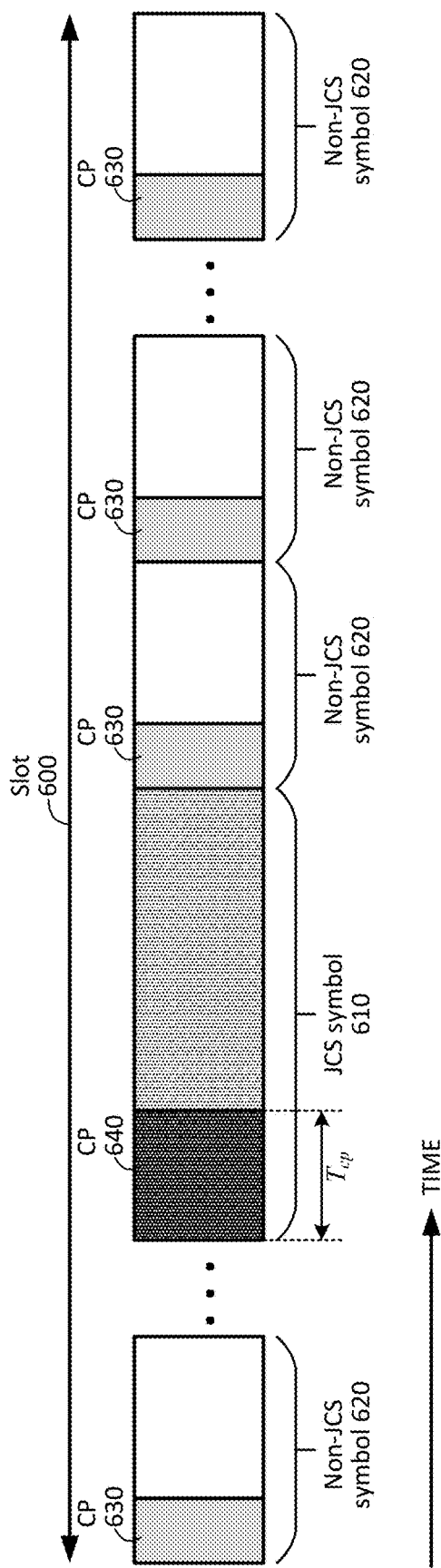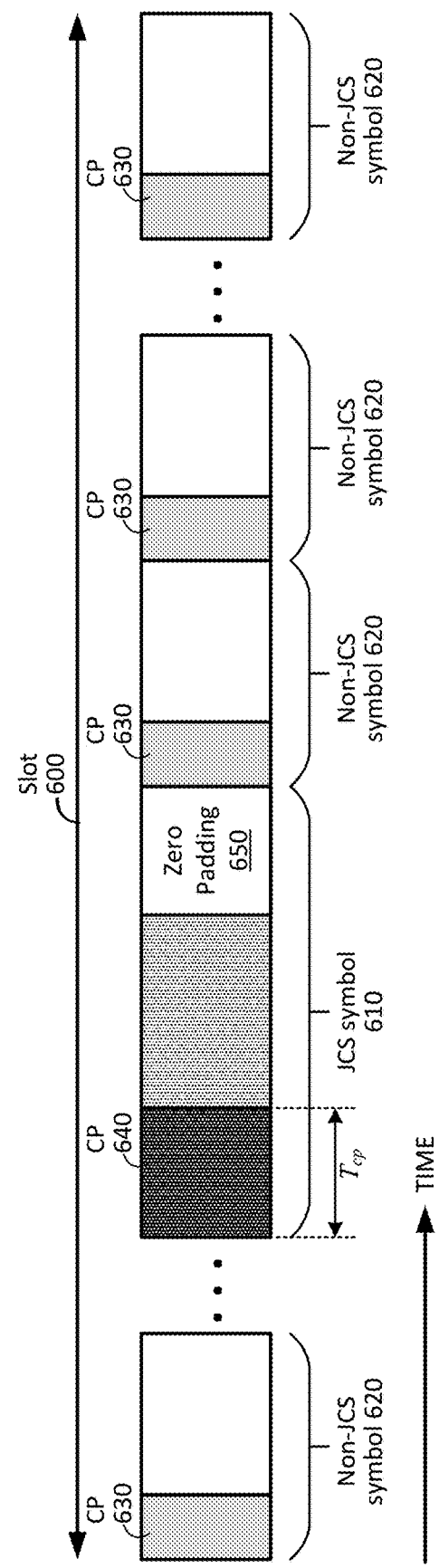
FIG. 6A
FIG. 6B

WAVEFORM DESIGNS FOR JCS IN NTN SYSTEMS

BACKGROUND

1. Field of Disclosure

The present disclosure relates generally to the field of radiofrequency (RF)-based sensing, or simply "RF sensing." More specifically, the present disclosure relates to RF sensing in a communication network comprising a Non-Terrestrial Network (NTN).

2. Description of Related Art

Camera-based optical imaging of the earth by satellites can provide accurate and detailed images of the earth's surface, as well as structures and objects thereon. Because visible-light cameras are limited to capturing images in the daytime, which may further be subject to interference from atmospheric phenomena such as clouds, satellite-based RF sensing may be used as a viable alternative for performing imaging of the earth's surface. The waveforms used for such RF sensing are typically incompatible with the orthogonal frequency-division multiplexing (OFDM) waveform used in prospective sixth-generation (6G) wireless communication systems with NTN systems. Thus, RF sensing is typically performed by non-communications systems.

BRIEF SUMMARY

Embodiments herein provide for a joint communication and sensing (JCS) (also known as JCAS or joint sensing and communication (JSC)) solution that modifies a cyclic prefix (CP) of a symbol in the OFDM waveform used in current and prospective NTN communication systems. This modified symbol, referred to herein as a JCS symbol, can allow for both RF sensing and communication. As described in further detail herein, the CP duration can be a function of the width of a RF footprint of RF signals transmitted by an NTN platform and a bandwidth of the RF signals.

An example method of enabling joint communication and sensing (JCS) by a non-terrestrial network (NTN), according to this disclosure, may comprise transmitting, with an NTN platform, radio frequency (RF) signals toward earth, the RF signals comprising an orthogonal frequency-division multiplexing (OFDM) waveform with a plurality of symbols including a JCS symbol and one or more non-JCS symbols, wherein the RF signals are incident on an area of the earth defining a footprint, and a duration of a cyclic prefix (CP) of the JCS symbol is a function of a width of the footprint. The method also may comprise receiving, at the NTN platform, one or more reflections of the JCS symbol.

An example method of enabling joint communication and sensing (JCS) by a non-terrestrial network (NTN), according to this disclosure, may comprise receiving, at a user equipment (UE) from an NTN platform, radio frequency (RF) signals comprising an orthogonal frequency-division multiplexing (OFDM) waveform with a plurality of symbols including a JCS symbol and one or more non-JCS symbols, wherein the RF signals are incident on an area of the earth defining a footprint, and a duration of a cyclic prefix (CP) of the JCS symbol is a function of a width of the footprint of the RF signals. The method also may comprise decoding the JCS symbol as a downlink (DL) communication symbol.

An example non-terrestrial network (NTN) platform for enabling joint communication and sensing (JCS) by an NTN, according to this disclosure, may comprise a transceiver, a memory, one or more processors communicatively coupled with the transceiver and the memory, wherein the one or more processors are configured to transmit, with the transceiver, radio frequency (RF) signals toward earth, the RF signals comprising an orthogonal frequency-division multiplexing (OFDM) waveform with a plurality of symbols including a JCS symbol and one or more non-JCS symbols, wherein: the RF signals are incident on an area of the earth defining a footprint, and a duration of a cyclic prefix (CP) of the JCS symbol is a function of a width of the footprint. The one or more processors further may be configured to receive, with the transceiver, one or more reflections of the JCS symbol.

An example user equipment (UE) for enabling joint communication and sensing (JCS) by a non-terrestrial network (NTN), according to this disclosure, may comprise a transceiver, a memory, one or more processors communicatively coupled with the transceiver and the memory, wherein the one or more processors are configured to receive, via the transceiver from an NTN platform, radio frequency (RF) signals comprising an orthogonal frequency-division multiplexing (OFDM) waveform with a plurality of symbols including a JCS symbol and one or more non-JCS symbols, wherein: the RF signals are incident on an area of the earth defining a footprint, and a duration of a cyclic prefix (CP) of the JCS symbol is a function of a width of the footprint. The one or more processors further may be configured to decode the JCS symbol as a downlink (DL) communication symbol.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 6A and 6B are timing diagrams showing how a joint communication and sensing (JCS) could be used in an orthogonal frequency-division multiplexing (OFDM) waveform, according to some embodiments.

Figure 1:
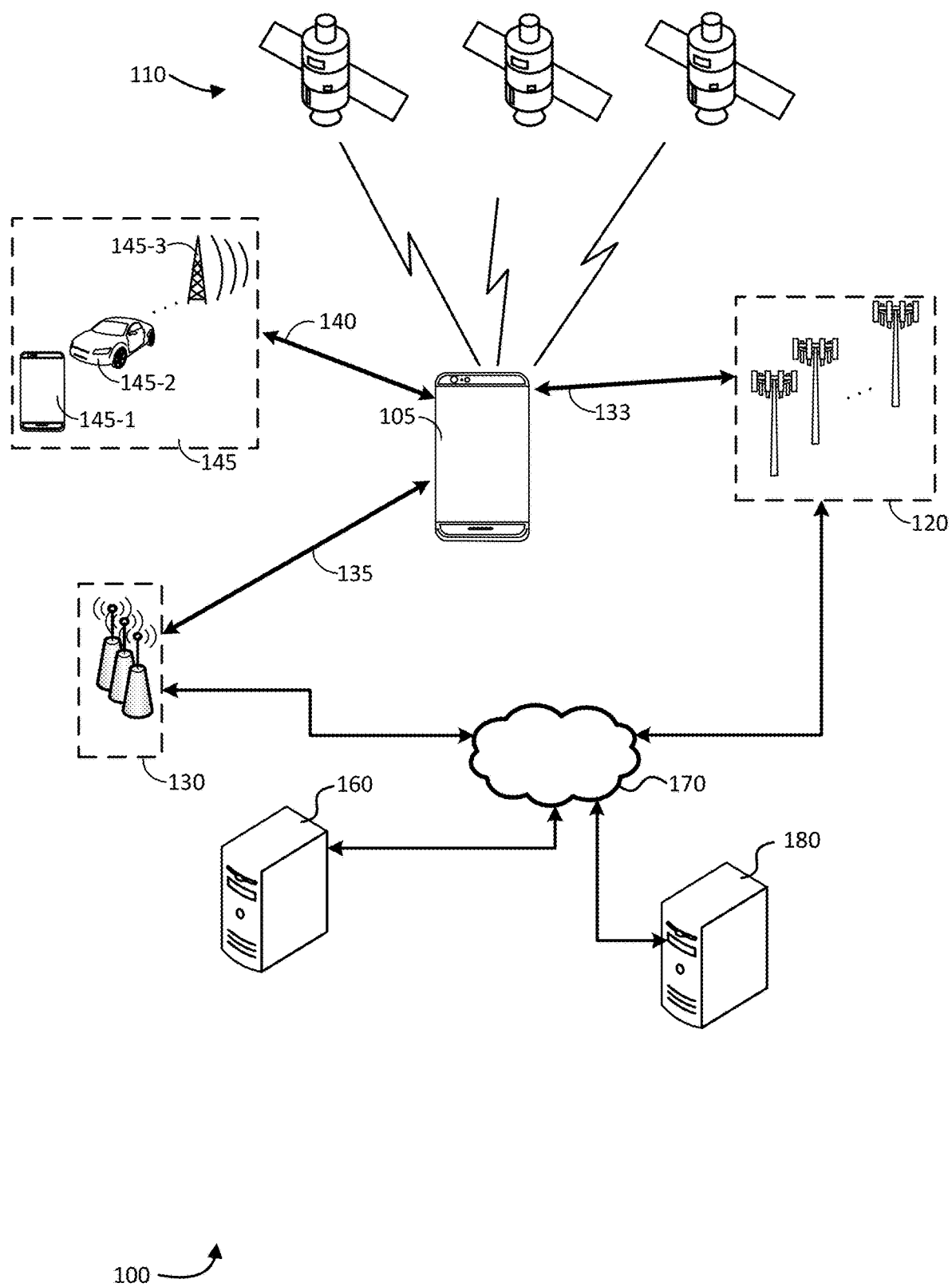
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

As previously noted, satellite and other non-terrestrial-based RF sensing may be used for performing RF sensing (e.g., RF imaging) of the earth's surface. The waveforms used in such RF sensing, however, are generally specific to RF-sensing applications and are therefore generally incompatible with the orthogonal frequency-division multiplexing (OFDM) waveform used in wireless communication networks (e.g., 4G/5G/6G cellular networks). However, as wireless communication networks expand to include non-terrestrial network nodes (also referred to herein as Non-Terrestrial Network (NTN) platforms), such as satellites and aerial vehicles (airplanes, drones, balloons, etc.), leveraging such nodes to further perform non-terrestrial RF sensing may make economic sense. Such non-terrestrial RF sensing may be used in addition or as an alternative to Terrestrial Network (TN)-based RF sensing. As noted, and as described in further detail hereafter, embodiments herein are directed toward adjusting and OFDM symbol in a way such that it is capable of joint communication and sensing (JCS) operations, enabling both communication and RF sensing.

In some embodiments NTN RF sensing may be used in a communication and positioning system, which may be implemented in a wireless cellular network. FIG. 1 provides an example of such a communication and positioning system.

FIG. 1 is a simplified illustration of a communication and positioning system 100 in which a UE 105, location server 160, and/or other components of the communication and positioning system 100 can use the techniques provided herein for enabling JCS at an NTN platform, according to an embodiment. (That said, embodiments are not necessarily limited to such a system.) The techniques described herein may be implemented by one or more components of the communication and positioning system 100. The communication and positioning system 100 can include: a UE 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; location server 160; network 170; and external client 180. Generally put, the communication and positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additionally, wireless devices such as the UE 105, base stations 120, and satellites 110 (and/or other NTN platforms, which may be implemented on airplanes, drones, balloons, etc.) can be utilized for RF sensing.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication and positioning system 100. Similarly, the communication and positioning system 100 may include a larger or smaller number of base stations 120 and/or APs 130 than illustrated in FIG. 1. The illustrated connections that connect the various components in the communication and positioning system 100 comprise data and signaling connections which may include additional (intermediary) components, direct or indirect physical and/or wireless connections, and/ or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning. In some embodiments NTN notes may include non-terrestrial vehicles such as airplanes, balloons, drones, etc., which may be in addition or as an alternative to NTN satellites. NTN satellites 110 and/or other NTN platforms may be further leveraged to perform RF sensing. As described in more detail hereafter, satellites may use a JCS symbol in an OFDM waveform to allow both RF sensing and communication.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
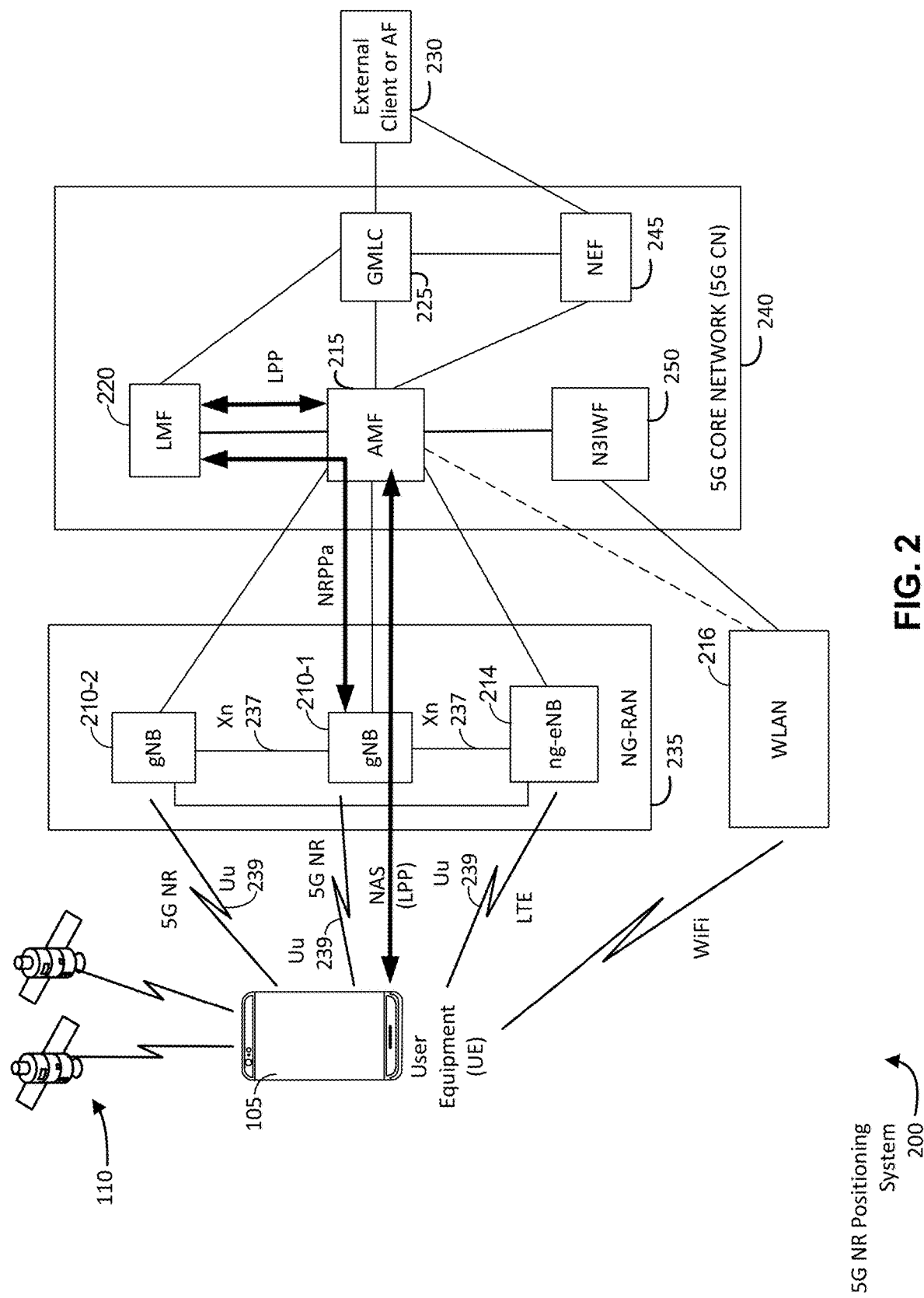
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example communication and positioning system 100 can be implemented using a wireless communication network, such as an LTE-based or 5G NR-based network, or a future 6G network. FIG. 2 shows a diagram of a 5G NR communication and positioning system 200, illustrating an embodiment of a positioning system (e.g., communication and positioning system 100) implementing 5G NR. The 5G NR communication and positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR communication and positioning system 200 additionally may be configured to determine the location of a UE 105 by using an LMF 220 (which may correspond with location server 160) to implement the one or more positioning methods. Here, the 5G NR communication and positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Additional components of the 5G NR communication and positioning system 200 are described below. The 5G NR communication and positioning system 200 may include additional or alternative components.

The 5G NR communication and positioning system 200 may further utilize information from satellites 110. As previously indicated, satellites 110 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR communication and positioning system 200. Similarly, the 5G NR communication and positioning system 200 may include a larger (or smaller) number of satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR communication and positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR communication and positioning system 200, such as the LMF 220 and AMF 215.

5G NR communication and positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR communication and positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhanced Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In addition to terrestrial base stations (gNB s 210, and in ng-eNB 214), referred to herein as terrestrial nodes, the NG-RAN 235 may include NTN nodes (or NTN platforms) that can be utilized for communication, positioning, and—according to embodiments herein—RF sensing.

Figure 3:
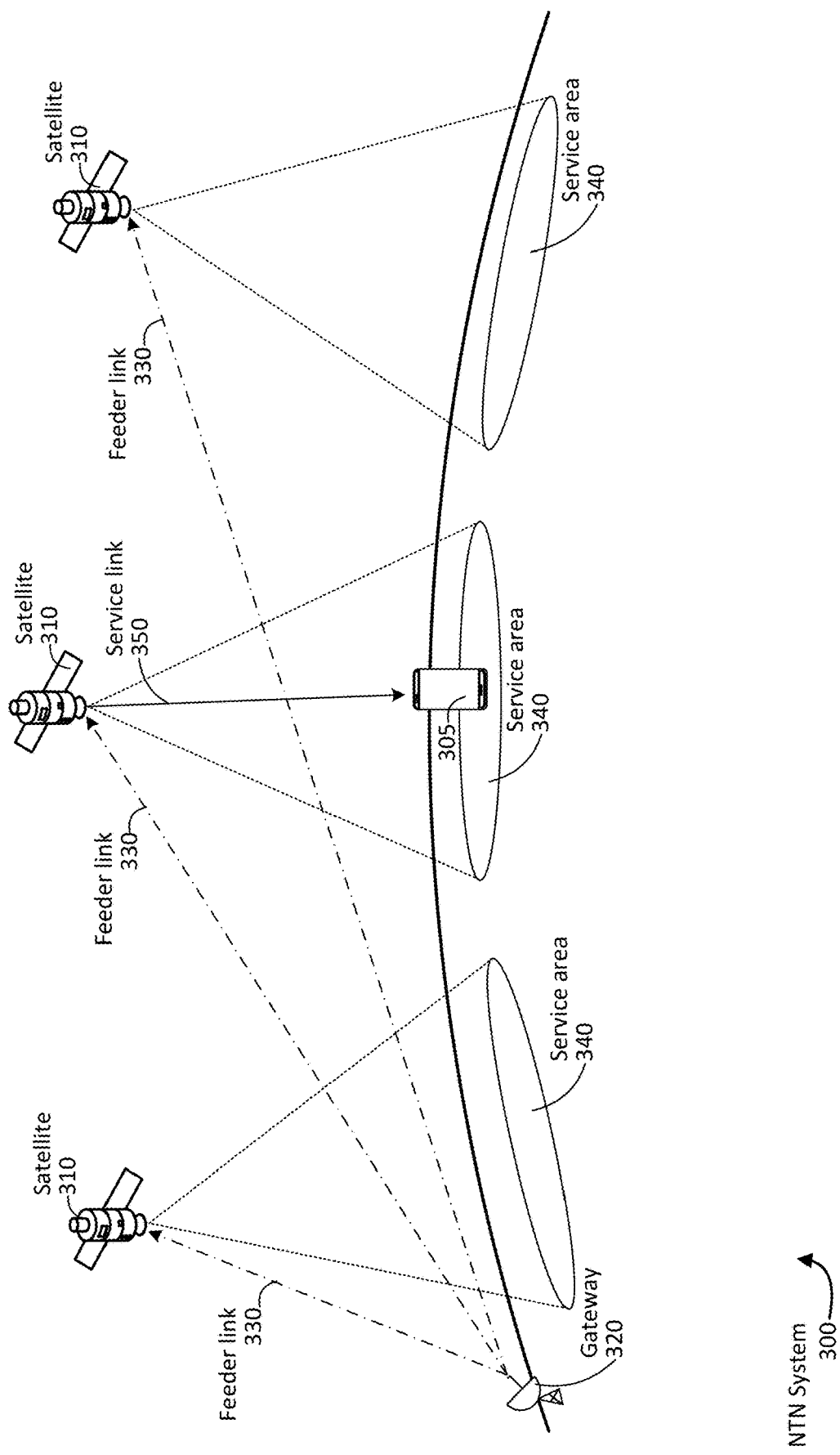
FIG. 3 is a graph illustrating aspects of a non-terrestrial network (NTN) system, according to an embodiment.

FIG. 3 is a graph illustrating aspects of an NTN system 300, which may be utilized to communicate data, provide positioning of a UE 305 (which may correspond to UE 105 of FIGS. 1 and 2), and/or perform RF sensing. The NTN system 300 may be part of a larger system that enable communication, positioning, and/or RF sensing (e.g., the communication and positioning systems 100 and 200 or FIGS. 1 and 2). It can be noted that, although the NTN system 300 illustrated in FIG. 3 illustrates satellites 310 for enabling communications and/or positioning of the UE 305, embodiments are not so limited. An NTN system 300 may additionally or alternatively include other non-terrestrial vehicles (not shown in FIG. 3), including non-space vehicles such as high-altitude platform stations, balloons, airplanes, drones, etc.

The use of satellites 310 and/or other non-terrestrial vehicles to relay communication signals and/or provide positioning for a UE 305 can help provide availability and continuity in geographical regions that may not otherwise be easily serviceable using terrestrial-only means. Satellites 310 may include low earth orbit (LEO) satellites, medium earth orbit (MEO) satellites, and/or geostationary earth orbit (GEO) satellites. The satellites 310 (and/or other non-terrestrial vehicles in an NTN system 300) may connect with a 5G or other communication network via a gateway 320 or ground station using wireless RF feeder links 330. Satellites 310 may service corresponding service areas 340 (which may be divided into one or more subregions, or "beams"), and may establish a service link 350 with a UE within a corresponding service area 340. The service area 340 may move, corresponding with the movement of the respective satellite 310 a long its orbit. The service link 350 may serve as a Uu interface to the wireless network access to via the gateway 320. In some embodiments, the gateway 320 and/or satellites 310 may be associated with a base station of cellular network (e.g., gNB of a 5G network), and may comprise remote RUs and/or DUs of the base station, operatively functioning as TRPs, TPs, and/or RPs of the base station.

Positioning a UE 305 using an NTN system 300 may be similar to positioning in a cellular network (e.g., as previously described with regard to 5G NR communication and positioning system 200 of FIG. 2). This can include, for example, the use of satellites 310 and/or other non-terrestrial vehicles of the NTN system 300 as transmission and/or reception points for transmitting and/or receiving reference signals for positioning the UE 305. Reference signals may then be used to perform positioning-related measurements, such as AoA, RTT, TDOA, etc. A location server communicatively linked with the gateway 320 may be used to coordinate positioning sessions using the UE 305 and one or more of the satellites 310.

As previously noted, the OFDM waveform utilized by current communication systems may prohibit satellites 310 from performing RF sensing. However, given that satellites 310 (and/or other NTN platforms, not shown in FIG. 3) are capable of sending and receiving RF signals for communication, an NTN system 300 may be well-situated for RF sensing otherwise. As noted, embodiments herein may utilize a JCS waveform that enables both RF sensing and communication (e.g., with the UE 305). Further details regarding this waveform are provided hereafter. The type of RF sensing performed may vary, but may include synthetic aperture radar (SAR), as described in FIG. 4.

Figure 4:
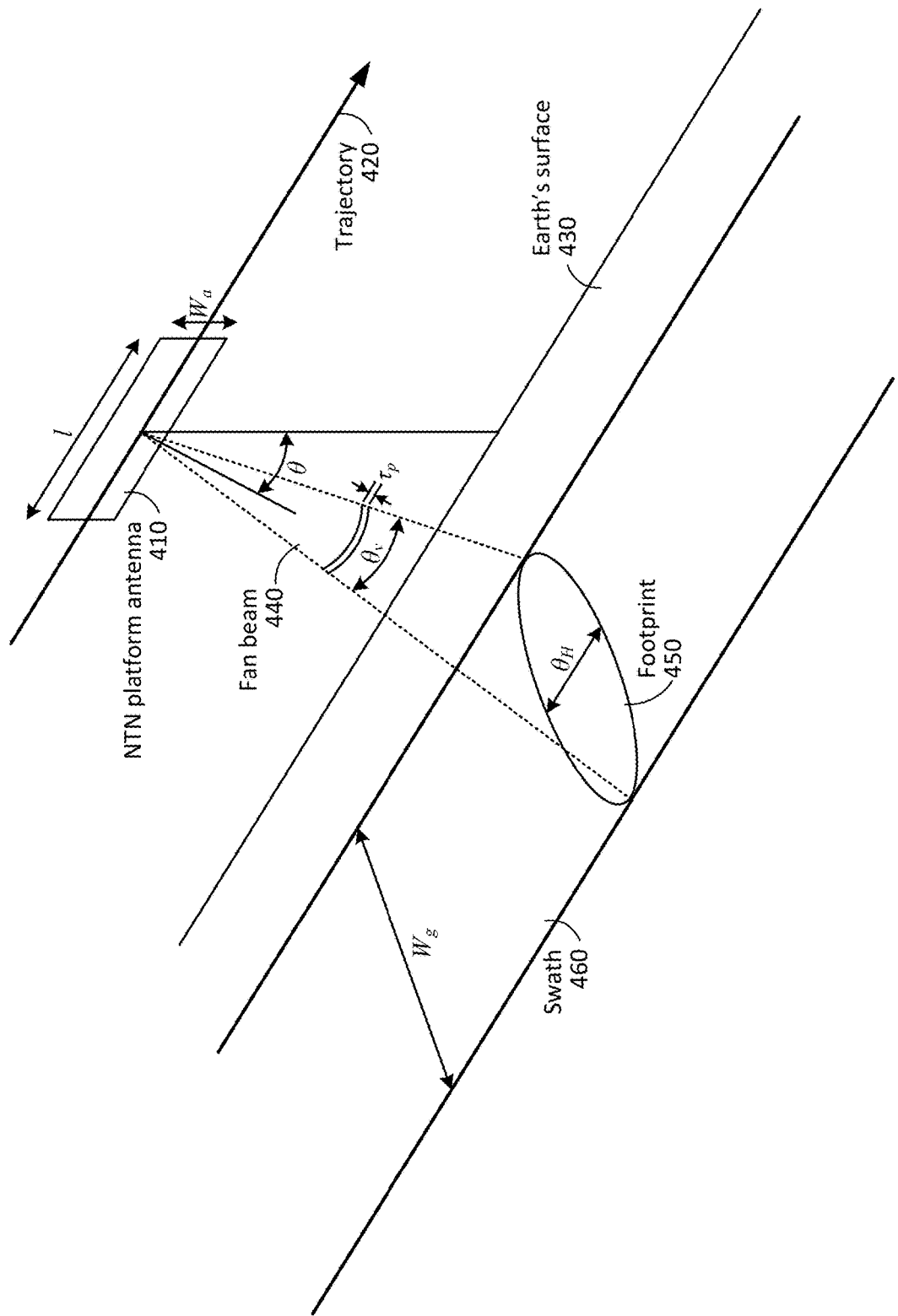
FIG. 4 is a simplified diagram of synthetic aperture radar (SAR) set up, according to an embodiment.

FIG. 4 is a simplified diagram of an SAR set up, provided to indicate how SAR could be implemented using an NTN platform, such a satellite 310 of FIG. 3 or other non-terrestrial vehicle, according to an embodiment. Here, the NTN platform (not shown) includes an NTN platform antenna 410 that travels (e.g., at a constant velocity) along a trajectory 420 (e.g., an orbital path) that is approximately parallel to the Earth's surface. In SAR, rather than having a long antenna array (a large/value) to achieve a high azimuth resolution, high azimuth resolution may be achieved by leveraging the motion of the NTN platform antenna to create a long "virtual" antenna.

For SAR imaging, the NTN platform antenna 410 can transmit RF signals in the form of radiated pulses to produce a fan beam 440 that illuminates a footprint 450 on the earth's surface 430. The echo or reflection of each pulse, which is received by the NTN platform antenna 410, can provide a "snapshot" of the corresponding footprint 450. As the NTN platform antenna 410 move along the trajectory 410, multiple snapshots can be combined to create an RF image of a swath 460 that runs parallel to the trajectory 420.

With respect to the various features in FIG. 4, they may be true determined using the geometric and optical properties of the system. For example, the angular across track 3 dB beamwidth, $\theta_v$, may be calculated as:

$$\theta_v = \lambda/W_a, \quad (1)$$

where $\lambda$ is the wavelength of the RF signals and $W_\alpha$ is the antenna width. The width of the ground swath, $W_g$, may be calculated as:

$$W_g = \frac{\lambda R}{W_a \cos(\theta)}, \quad (2)$$

where R is the distance from the satellite antenna to the center of the satellite beam footprint on the ground and $\theta$ is the look angle. The range resolution of aperture radar, $\rho_g$, may be calculated as:

$$\rho_g = \frac{c\tau_p}{2\sin(\theta)}; \quad (3)$$

where c is the speed of light and $\tau_p$ is the duration of the RF signal pulses. The azimuth resolution, $\rho_\alpha$, may be calculated as:

$$\rho_a = R\theta_H = \frac{R\lambda}{l}. \quad (4)$$

where $\theta_H$ is the width of the footprint in radians.

Delays in the RF signals may prevent the NTN platform antenna 410 from using an OFDM waveform used in communication systems for RF sensing. That is, because the swath width 460 may be on the order of kilometers (e.g., 5-60 km for NTN platforms comprising airplanes or LEO satellites, and perhaps 100 km or more for some satellite NTN platforms), there may be a substantial difference between the NTN platform antenna's receipt of an echo from one portion of the footprint 450 (e.g., the center of the footprint) and an echo from another portion of the footprint 450 (e.g., an edge). As described in more detail with respect to FIG. 5, a traditional all FTM waveform used in communication systems may result in inter-range-cell interference (IRCI).

Figure 5:
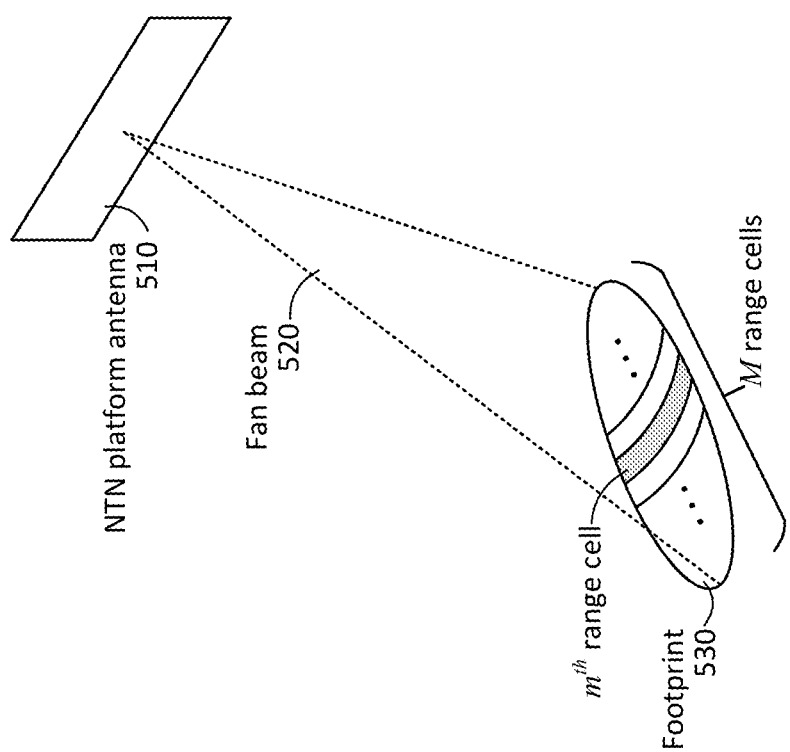
FIG. 5 is a diagram illustrating an example of range cells in a SAR setup.

FIG. 5 is a diagram illustrating the NTN platform antenna 510, fan beam 520, and footprint 530 similar to FIG. 4. Other features of FIG. 4 have been removed to avoid clutter. FIG. 5 further illustrates M range cells spanning across the footprint 530. High-resolution RF sensing distinguishes between echoes from objects at different range cells, whereas IRCI can reduce this resolution. According to embodiments herein, the length of a cyclic prefix (CP) used in a communication symbol transmitted by the NTN platform antenna 510 can provide for IRCI mitigation.

As a person of ordinary skill in the art will appreciate, an OFDM scheme partitions time and frequency into various resources. Across one or more frequencies, time may be partitioned into units of radio frames, which are divided into subframes, which are divided into slots. Each slot may include a variable number of symbols, which may depend on the subcarrier spacing (SCS) for the slot.

At the beginning of each symbol, a CP is used. In traditional communication systems, CP and symbol lengths within a slot are common for all symbols in a slot. The use of CPs can convert an inter-symbol interference (ISI) channel into multiple ISI-free subchannels in a wireless communications system. Analogously, embodiments can use a modified OFDM symbol (again, referred to herein as a JCS symbol) with a CPs having an increased duration to enable the NTN platform antenna 510 to distinguish echoes of the JCS symbol at different range cells, achieving IRCI-free (high range resolution) RF sensing.

FIG. 6A is a timing diagram that illustrates a slot 600 having a JCS symbol and multiple non-JCS symbols 620, according to an embodiment. All symbols in the slot 600, including the JCS symbol 610 can be used for communication. All non-JCS symbols 620 may include CPs 630 having a traditional duration. As noted, the duration, $T_{cp}$, of the CP 640 of the JCS symbol 610, however may be increased to enable an NTN platform to perform RF sensing with the JCS symbols 610. Such RF sensing may be used, for example, to perform SAR in the manner previously discussed, although embodiments are not so limited.

According to some embodiments, the duration, $T_{cp}$, of the CP 640 of the JCS symbol 610 can be determined to satisfy:

$$T_{cp} \geq T_o, \quad (5)$$

where $T_o$ is the time delay difference between first and last range cells in a footprint. $T_o$ may be determined as:

$$T_o = 2(M-1)d_{res}/c = (M-1)/B \quad (6)$$

In equations (6), range resolution, $d_{res}$, may be determined as $d_{res} = c/(2B)$. Additionally, B is bandwidth of the RF signals and M is the number of cells (e.g., as shown in FIG. 5). According to some embodiments, in order to minimize the unnecessary transmission energy without loss of generality, CP length could be chosen as:

$$T_{cp} = T_o. \quad (7)$$

Again, the duration, $T_{cp}$, of the CP 640 of the JCS symbol 610 could be relatively large given that the footprint could be many kilometers wide and the corresponding time delay difference, $T_o$, between first and last range cells in the footprint could be on the order of several ms or more. Thus, while the non-JCS symbols 620 and the duration of their CPs 630 may be sufficient for RF sensing at PN nodes (e.g., terrestrial base stations), the JCS symbol 610 with its corresponding CP 640 (e.g., as determined using the above equations) can account for the large footprint and relatively long brown-trip time delay, enabling IRCI-free high-resolution RF sensing by an NTN platform.

According to various embodiments, JCS symbol 610 could be flexibility configured to enable ICRI-free RF sensing. This includes, for example, alignment with other non-JCS symbols 620 (e.g., within a slot 600). FIG. 6A illustrates a first approach in which the JCS symbol 610 may have a different SCS than the non-JCS symbols 620. This can allow the JCS symbol 610 to have a different duration (e.g., to accommodate the longer CP 640). Additionally or alternatively, as illustrated in FIG. 6B, a JCS symbol 610 can include a portion with zero padding 650, which can be included to ensure the duration of the JCS symbol 610 is an integer multiple (e.g., 2×, 3×, etc.) of the durations of the non-JCS symbols 620. Again, the use of a JCS symbol 610 in this manner can enable continued communication in a communication network that uses OFDM waveforms (e.g., 5G and likely 6G wireless networks), as well as RF sensing by an NTN platform.

The NTN platform may transmit JCS symbols in accordance with an RF sensing scheme. For example, the NTN platform may transmit one or more JCS symbols to perform RF sensing of a particular location as the NTN platform passes the location in the sky. Thus, NTN platform's approach to the particular location may trigger the transmission of JCS symbols. Additionally or alternatively, the NTN platform may transmit JCS symbols periodically to perform imaging of a swath, in accordance to SAR or a similar RF sensing scheme. The periodicity of the JCS symbols may be dictated by factors such as the NTN platform's speed and a length of the footprint. In such embodiments, a minimum periodicity may be used to ensure proper imaging of the swath or other sensed area. Periodicity may also be determined to help reduce any impact the transmission of JCS symbols may have on wireless communication.

In sum, embodiments provided herein can utilize a JCS symbol, which could be included in a OFDM slot along with one or more non-JCS (e.g., traditional) symbols. The JCS symbol could serve as DL communication symbol transmitted by an NTN platform (e.g., a satellite, airplane, etc.).

According to some embodiments, a capability exchange may be utilized to ensure one or more UEs within a coverage area (e.g., footprint) of the NTN platform are capable of receiving the JCS symbol. Accordingly, a UE may communicate one or more capabilities to the NTN platform and/or a server of the network. Once it capability comprises a buffering capability of the UE, which can indicate whether the UE could capture the whole JCS symbol. Another capability may comprise whether the UE can support a different SCS within a slot. If not, a JCS symbol comprising zero pattern could be used, similar to FIG. 6B, for example. Another capability may comprise an FFT size supported by the UE. An SCS may be small in the JCS symbol, which can result in an FFT size larger than regular (non-JCS) symbols. Depending on desired functionality, a UE a communicate any combination of these capabilities related to receiving a JCS symbol.

Additionally, a UE may need to adjust or retrain its automatic gain control (AGC) for reception of the JCS symbol. Communication signals included in traditional non-JCS symbols travel one-way: from the NTN platform to a UE on earth. However, RF sensing of a JCS symbol is based on echoes all reflections of the JCS symbol received at the NTN platform. Thus, for RF sensing, signals in the JCS symbol can travel twice the distance of signals in non-JCS symbols, and therefore may experience twice the path loss. As such, in NTN platform may transmit the JCS symbol at a much higher power. To avoid saturation of the signal received at the UE due to this higher transmission power, the UE can adjust its AGC accordingly.

According to some embodiments, information regarding the JCS symbol can be communicated to a UE in a CP length configuration. In some embodiments, the CP length configuration may be included with or in another configuration provided to the UE. For example, in some embodiments, the CP length configuration may be bundled with a bandwidth part (BWP) configuration provided to the UE. According to some embodiments, the CP length of a JCS symbol could be standardized or predefined such that the CP length configuration may include fewer bits (e.g., an index number referencing a known/predefined length of the CP to the UE). Additionally or alternatively, the network may provide a configuration to the UE that conveys other aspects of the JCS symbol. These other aspects may include, for example, location of the JCS symbol within a slot, duration of the JCS symbol, SCS of the JCS symbol, transmission power, timing of a received window (described in more detail hereafter), and the like. Depending on desired functionality, the CP length configuration and/or other JCS symbol configuration information be signaled to the UE via L1/L2/L3 configuration messages, such as via downlink control information (DCI), a media access control-control element (MAC-CE), and/or radio resource control (RRC).

Because RF sensing performed by an NTN platform can experience a relatively long delay between transmission of the JCS symbol and reception of the echo(es)/reflection(s) of the JCS symbol, there may be no self-interference (transmission and reception occurring at the same time). To avoid interference with other RF signals such as UL signals transmitted by one or more UEs, the network can implement a receive window to receive the echo(es) of the JCS symbol. Example of this is illustrated in FIG. 7.

Figure 7:
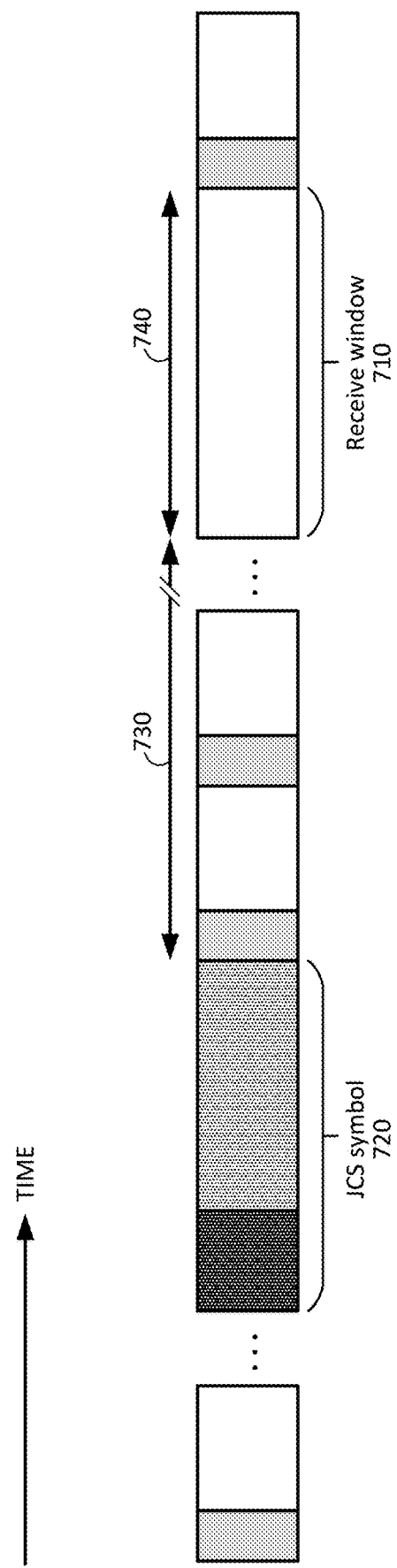
FIG. 7 is an illustration of a timeline, similar to FIGS. 6A and 6B, illustrating how a receive window may follow a JCS symbol, according to some embodiments.

FIG. 7 is an illustration of a timeline, similar to FIGS. 6A and 6B, illustrating how a receive window 710 may follow a JCS symbol 720, according to some embodiments. As noted, to help minimize interference when the NTN platform received echoes from the transmissions made during the JCS symbol 720, the communication network may schedule a receive window 710 during which UEs do not transmit UL signals to the NTN platform. Additionally, the NTN platform may refrain from transmitting to avoid self-interference. This can help reduce the amount of RF interference received at the NTN platform when the at NTN platform is receiving echoes of the JCS symbol 720.

Properties of the receive window 710 can be determined from known information regarding the NTN platform. For example, the duration 730 between the JCS symbol 720 and the receive window 710 can be determined geometrically, based on the height of the NTN platform and angle to the footprint. The duration 740 of the receive window 710 can be determined based on swath width (e.g., expected time delay between the first and last range cells in the swath).

Figure 8:
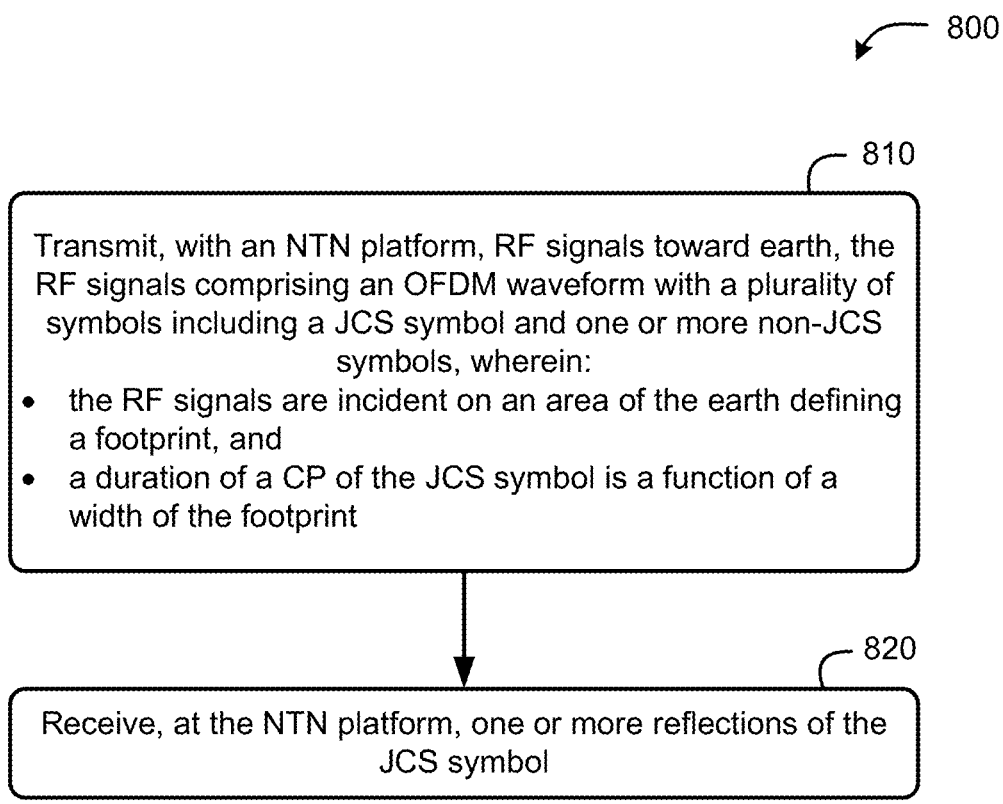
FIG. 8 is a flow diagram of a method of enabling JCS by an NTN, which can be performed by an NTN platform, according to an embodiment.

FIG. 8 is a flow diagram of a method of enabling JCS by an NTN, according to an embodiment. Means for performing the functionality illustrated in one or more of the blocks shown in FIG. 8 may be performed by hardware and/or software components of an NTN platform, such as the NTN platform 1100 illustrated in FIG. 11 and described hereafter. In some embodiments, operations may be performed by a computer system (e.g., a server) communicatively coupled with an NTN platform. An example computer system 1200 is illustrated in FIG. 12 and described hereafter.

At block 810, the functionality comprises transmitting, with an NTN platform, RF signals toward earth, the RF signals comprising an OFDM waveform with a plurality of symbols including a JCS symbol and one or more non-JCS symbols, wherein the RF signals are incident on an area of the earth defining a footprint, and a duration of a CP of the JCS symbol is a function of a width of the footprint. As noted, the duration of the CP may also be a function of a bandwidth of the RF signals, in some embodiments. For embodiments implementing SAR, the width of the footprint may correspond to the swath width, as previously described. As noted previously, in some embodiments, duration of the JCS symbol is longer than a duration of the one or more non-JCS symbols. As illustrated in FIGS. 6A and 6B, there may be different ways to accommodate this longer duration of the JCS symbol. Thus, some embodiments of the method 800 may comprise zero-padding the JCS symbol such that the duration of the JCS symbol is an integer multiple of the duration of the one or more non-JCS symbols. According to some embodiments, the JCS symbol may have a different sub-carrier spacing (SCS) than the one or more non-JCS symbols.

As previously noted, the transmission of the JCS symbol may be responsive, at least in part, to an indication that a UE (e.g., located in an area of the footprint of the NTN platform, such as to receive the JCS symbol) has the capability of receiving (and decoding) the JCS symbol. As such, according to some embodiments of the method 800, transmitting the JCS symbol may be responsive to receiving an indication from a user equipment (UE) that the UE is capable of decoding the JCS symbol as a downlink (DL) communication symbol. In such embodiments, the indication may include information indicative of a buffering capability of the UE, a capability of the UE to support a different SCS within an OFDM slot, or a fast Fourier transform (FFT) size supported by the UE, or any combination thereof. Additionally or alternatively, the method 800 may further comprise communicating a CP length configuration to the UE. As noted elsewhere herein, this can be bundled with other configurations (e.g., a BWP configuration). The CP length configuration may be communicated to the UE via DCI, MAC-CE, and/or RRC.

Figure 11:
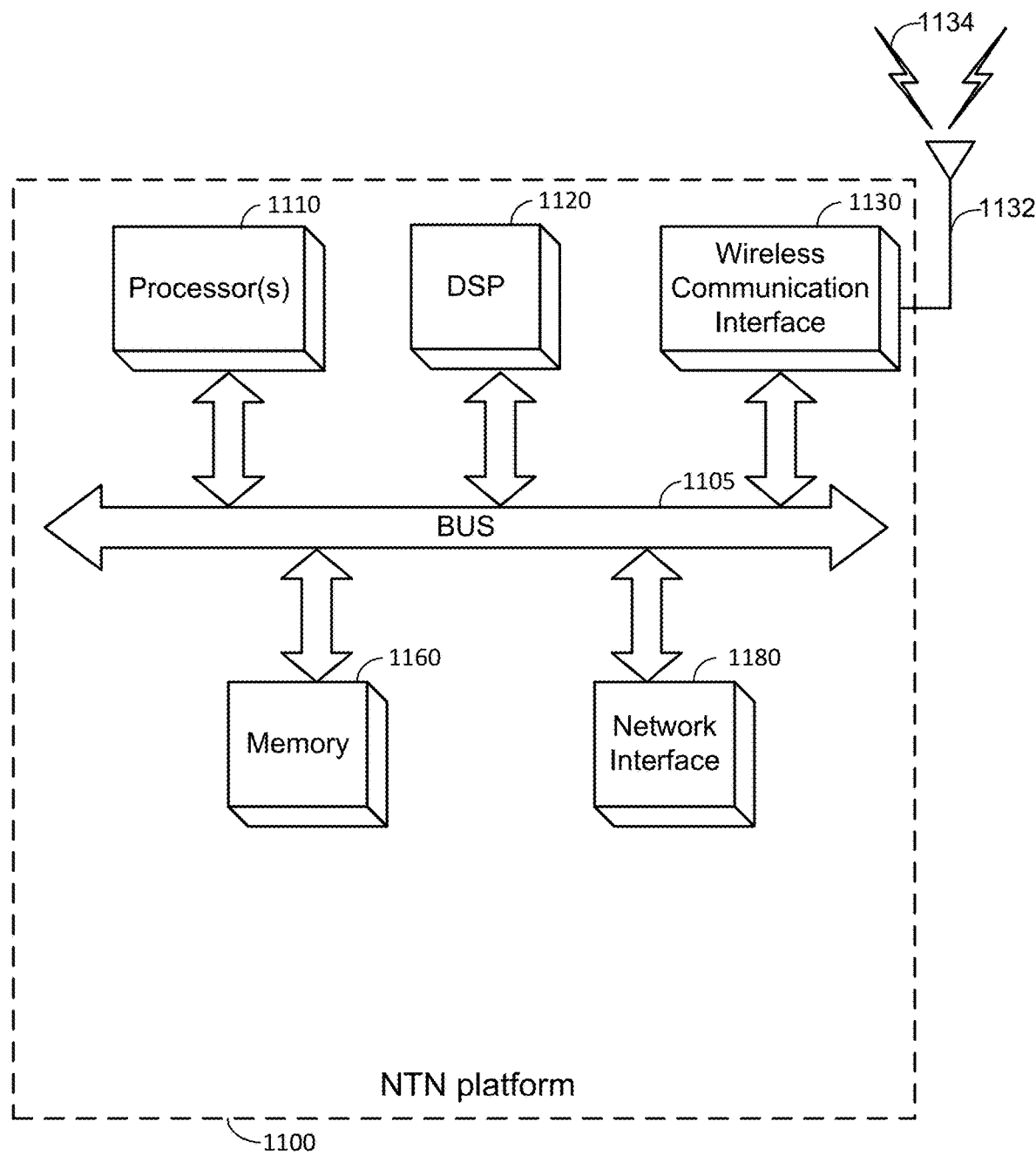
FIG. 11 a block diagram of an embodiment of an NTN platform, which can be utilized in embodiments as described herein.
Figure 12:
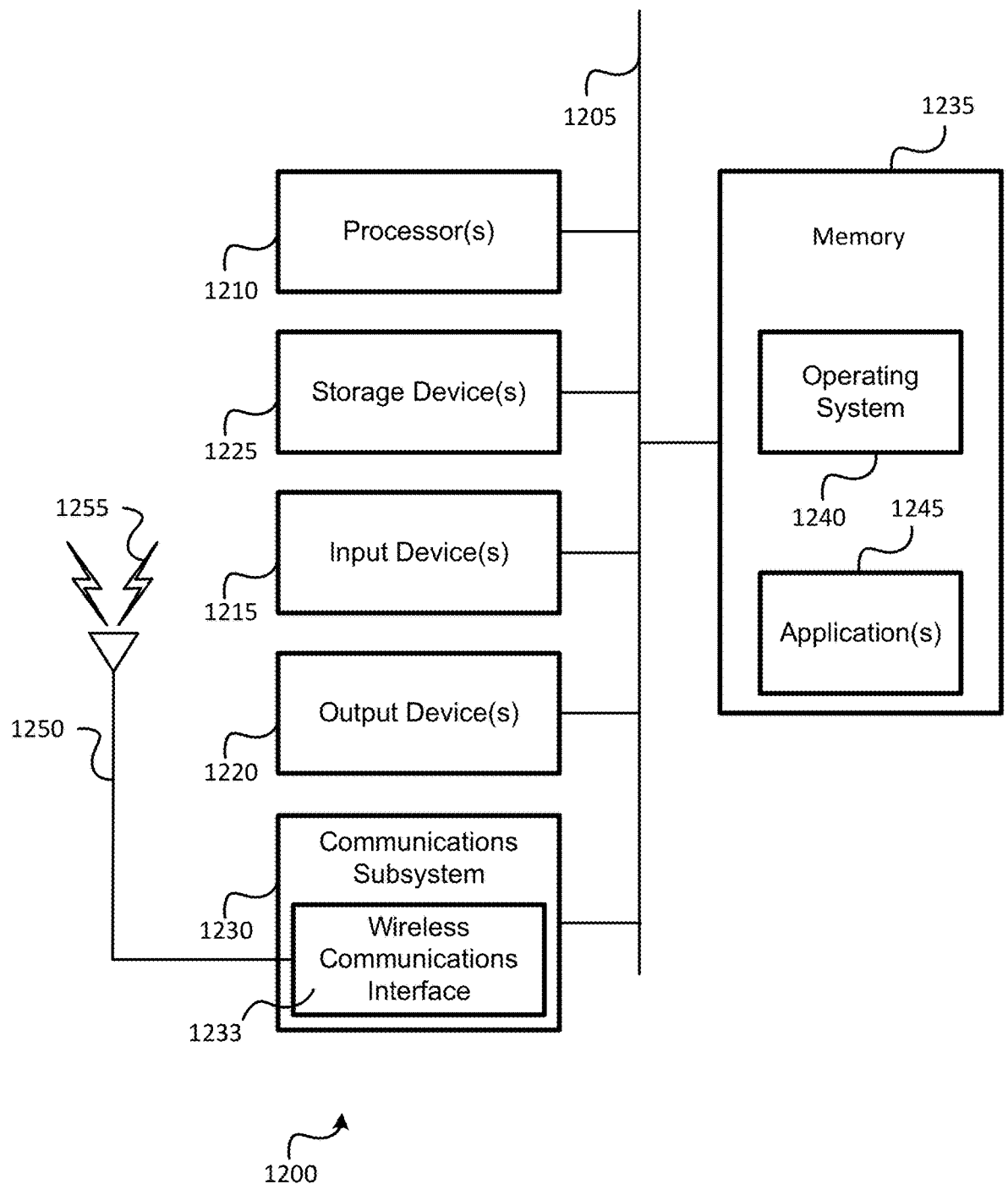
FIG. 12 is a block diagram of an embodiment of a computer system, which can be utilized in embodiments as described herein.

Means for performing functionality at block 810 may comprise a bus 1105, processor(s) 1110, DSP 1120, wireless communication interface 1130, memory 1160, and/or other components of an NTN platform 1100, as illustrated in FIG. 11.

At block 820, the functionality comprises receiving, at the NTN platform, one or more reflections of the JCS symbol. According to some embodiments, receiving the one or more reflections (or echoes) of the JCS symbol may occur during a sensing receive window during which no UL transmissions by the UE are scheduled. As noted, the location (e.g., in a slot) and duration of the receive window may be determined based on various factors, as discussed with regard to FIG. 7. The NTN platform (or a computer communicatively coupled therewith) may then perform RF sensing with the one or more reflections, as described elsewhere herein. As described with respect to FIGS. 4 and 5, this may include SAR.

Means for performing functionality at block 820 may comprise a bus 1105, processor(s) 1110, DSP 1120, wireless communication interface 1130, memory 1160, and/or other components of an NTN platform 1100, as illustrated in FIG. 11.

Figure 9:
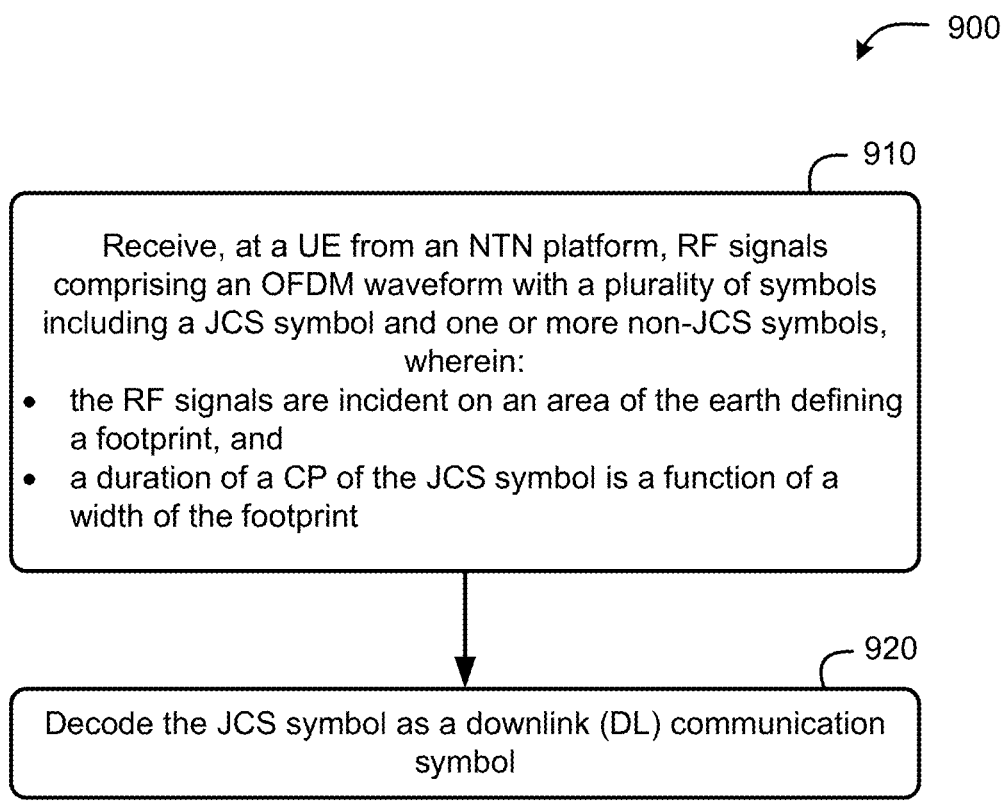
FIG. 9 is a flow diagram of another method enabling JCS by an NTN, which can be performed by a user equipment (UE), according to an embodiment.
Figure 10:
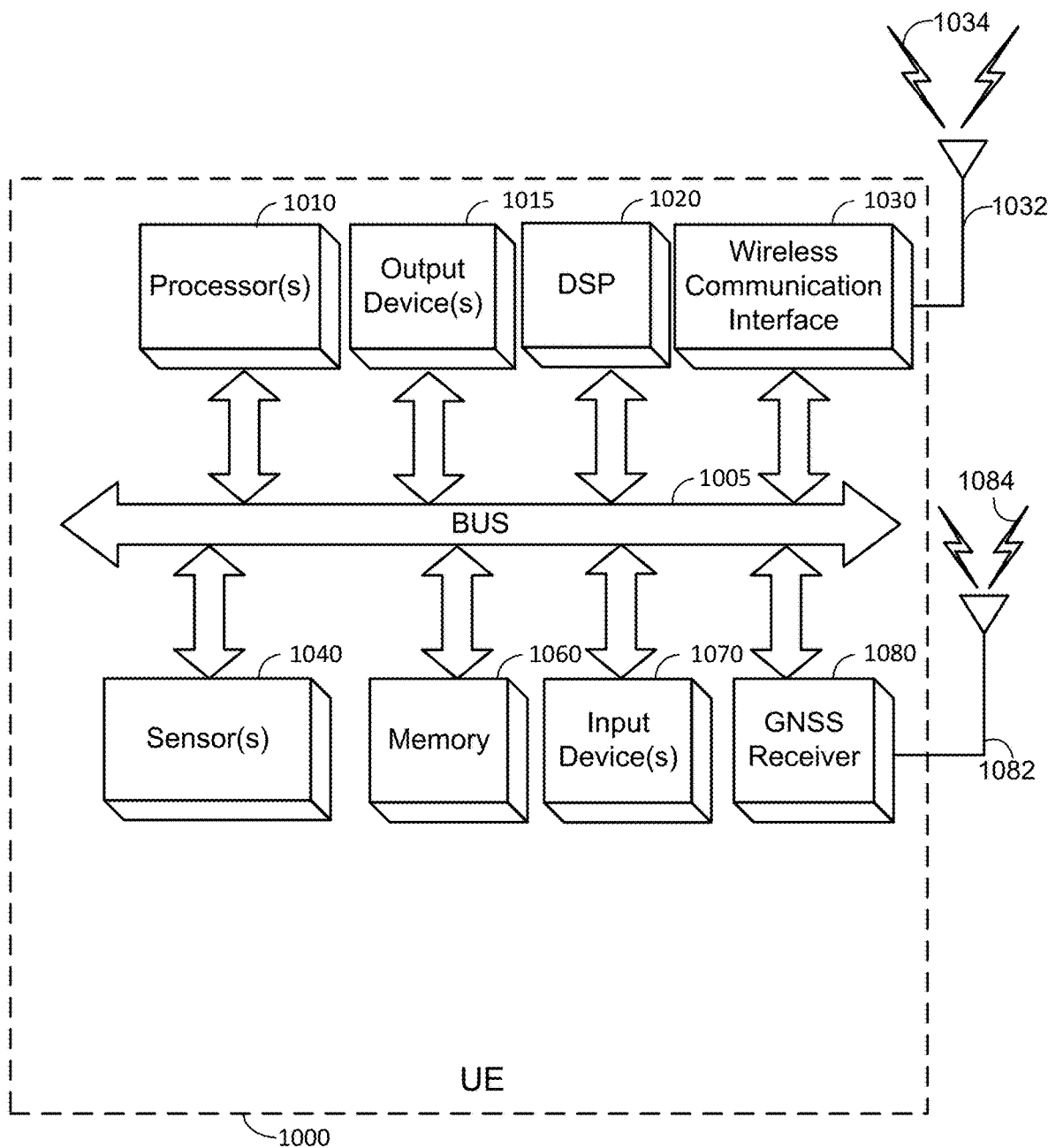
FIG. 10 is a block diagram of an embodiment of a UE, which can be utilized in embodiments as described herein.

FIG. 9 is a flow diagram of another method enabling JCS by an NTN, according to an embodiment. Means for performing the functionality illustrated in one or more of the blocks shown in FIG. 9 may be performed by hardware and/or software components of a UE, and may correspond to UE-side functionality when an NTN platform is executing the method 800 of FIG. 8. An example UE 1000 is illustrated in FIG. 10 and described hereafter.

At block 910, the functionality comprises receiving, at a UE from an NTN platform, RF signals comprising an OFDM waveform with a plurality of symbols including a JCS symbol and one or more non-JCS symbols, wherein the RF signals are incident on an area of the earth defining a footprint, and a duration of a CP of the JCS symbol is a function of a width of the footprint. As noted, the duration of the CP may also be a function of a bandwidth of the RF signals, in some embodiments. As noted elsewhere herein, the UE may be notified of the JCS symbol from a configuration sent to the UE beforehand (e.g., by the NTN platform or another node of the wireless network). This may comprise, for example, a CP length configuration. Thus, some embodiments of the method 900 may further comprise receiving, prior to receiving the RF signals, a configuration indicating a duration of the JCS symbol is longer than a duration of the one or more non-JCS symbols. In such embodiments, the configuration may indicate the JCS symbol has a different sub-carrier spacing (SCS) than the one or more non-JCS symbols.

Further, the transmission of the JCS symbol may be responsive to the UE providing capability information to the network. As such, some embodiments of the method 900 may comprise sending an indication to a network node from that the UE is capable of decoding the JCS symbol as a downlink (DL) communication symbol. Here, the network node may comprise the NTN platform or another wireless node of the communication network (e.g., a terrestrial base station). Some embodiments may further comprise including, in the indication, information indicative of a buffering capability of the UE, a capability of the UE to support a different SCS within an OFDM slot, or a fast Fourier transform (FFT) size supported by the UE, or any combination thereof.

Means for performing functionality at block 910 may comprise a bus 1105, processor(s) 1110, DSP 1120, wireless communication interface 1130, memory 1160, and/or other components of an NTN platform 1100, as illustrated in FIG. 11.

At block 920, the functionality comprises decoding the JCS symbol as a DL communication symbol. As noted previously, to do so, the UE may adjust and AGC to avoid saturation of the received JCS symbol. Additional or alternative adjustments may be performed by the UE to receive the JCS symbol before and/or after transmitting and/or receiving UL and/or DL signals during non-JCS symbols. Some embodiments of the method 900 may further comprise receiving a configuration defining a sensing receive window, occurring after transmission of the RF signals, during which the UE is not scheduled to perform any UL transmissions.

Means for performing functionality at block 920 may comprise a bus 1105, processor(s) 1110, DSP 1120, wireless communication interface 1130, memory 1160, and/or other components of an NTN platform 1100, as illustrated in FIG. 11.

FIG. 10 is a block diagram of an embodiment of a UE 1000, which can be utilized as described herein above (e.g., in association with FIGS. 1-9). For example, the UE 1000 can perform one or more of the functions of the method shown in FIG. 9. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 10.

The UE 1000 is shown comprising hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple ICs. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 1002.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processor(s) 1010 or DSP 1020 within UE 1000). In some embodiments, then, such code and/or instructions can be used to configure and/or adapt a general-purpose computer (or other device) to perform one or more operations in accordance with the described methods.

FIG. 11 is a block diagram of electrical components of an embodiment of a NTN platform 1100, which can be utilized as described herein above (e.g., in association with FIGS. 1-9). As described herein, an NTN platform 1100 may comprise satellite or other non-terrestrial vehicle (airplane, balloon, drones, etc.). More specifically, in NTN platform 1100 may comprise a communication system on, in, and/or integrated into an non-terrestrial vehicle. It should be noted that FIG. 11 is meant only to provide a generalized illustration of various components, any or all of which may be utilized as appropriate. In some embodiments, the NTN platform 1100 may correspond to a gNB, an ng-eNB, and/or (more generally) a TRP.

The NTN platform 1100 is shown comprising hardware elements that can be electrically coupled via a bus 1105 (or may otherwise be in communication, as appropriate). The hardware elements may include a processor(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below), according to some embodiments. The NTN platform 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The NTN platform 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the NTN platform 1100 to communicate an perform RF sensing as described herein, including transmitting DL RF signals during a JCS symbol. The wireless communication interface 1130 may permit data and signaling to be communicated (e.g., transmitted and received) to UEs, other base stations/TRPs (e.g., eNBs, gNB s, and ng-eNBs), and/or other network components, computer systems, and/or any other electronic devices described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams, such as fan beam 440). Beam formation may be performed using digital and/or analog beam formation techniques, with respective digital and/or analog circuitry. The wireless communication interface 1130 may include such circuitry.

The NTN platform 1100 may also include a network interface 1180. According to some embodiments, this may comprise a wireless communication interface having some or all of the components of the wireless communication interface 1130 described above. According to some embodiments, the network interface 1180 may be incorporated into the wireless communication interface 1130. The network interface 1180 may include one or more input and/or output communication interfaces to permit data to be exchanged with a network, communication network servers, computer systems, and/or any other electronic devices described herein (e.g., via a gateway 320 as illustrated in FIG. 3).

In many embodiments, the NTN platform 1100 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the NTN platform 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the NTN platform 1100 (and/or processor(s) 1110 or DSP 1120 within NTN platform 1100). In some embodiments, then, such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of one or more network components as described in the embodiments herein (e.g., a server). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers that may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of enabling joint communication and sensing (JCS) by a non-terrestrial network (NTN), the method comprising: transmitting, with an NTN platform, radio frequency (RF) signals toward earth, the RF signals comprising an orthogonal frequency-division multiplexing (OFDM) waveform with a plurality of symbols including a JCS symbol and one or more non-JCS symbols, wherein: the RF signals are incident on an area of the earth defining a footprint, and a duration of a cyclic prefix (CP) of the JCS symbol is a function of a width of the footprint; and receiving, at the NTN platform, one or more reflections of the JCS symbol.

Clause 2. The method of clause 1, further comprising performing RF sensing with the one or more reflections.

Clause 3. The method of any one of clauses 1-2 wherein a duration of the JCS symbol is longer than a duration of the one or more non-JCS symbols.

Clause 4. The method of clause 3 further comprising zero-padding the JCS symbol such that the duration of the JCS symbol is an integer multiple of the duration of the one or more non-JCS symbols.

Clause 5. The method of any one of clauses 3-4 wherein the JCS symbol has a different sub-carrier spacing (SCS) than the one or more non-JCS symbols.

Clause 6. The method of any one of clauses 1-5 wherein transmitting the JCS symbol is responsive to receiving an indication from a user equipment (UE) that the UE is capable of decoding the JCS symbol as a downlink (DL) communication symbol.

Clause 7. The method of clause 6 wherein the indication includes information indicative of: a buffering capability of the UE, a capability of the UE to support a different SCS within an OFDM slot, or a fast Fourier transform (FFT) size supported by the UE, or any combination thereof.

Clause 8. The method of any one of clauses 6-7 further comprising communicating a CP length configuration to the UE.

Clause 9. The method of any one of clauses 6-8 wherein receiving the one or more reflections of the JCS symbol occurs during a sensing receive window during which no uplink (UL) transmissions by the UE are scheduled.

Clause 10. A method of enabling joint communication and sensing (JCS) by a non-terrestrial network (NTN), the method comprising: receiving, at a user equipment (UE) from an NTN platform, radio frequency (RF) signals comprising an orthogonal frequency-division multiplexing (OFDM) waveform with a plurality of symbols including a JCS symbol and one or more non-JCS symbols, wherein: the RF signals are incident on an area of the earth defining a footprint, and a duration of a cyclic prefix (CP) of the JCS symbol is a function of a width of the footprint of the RF signals; and decoding the JCS symbol as a downlink (DL) communication symbol.

Clause 11. The method of clause 10, further comprising receiving, prior to receiving the RF signals, a configuration indicating a duration of the JCS symbol is longer than a duration of the one or more non-JCS symbols.

Clause 12. The method of clause 11 wherein the configuration indicates the JCS symbol has a different sub-carrier spacing (SCS) than the one or more non-JCS symbols.

Clause 13. The method of any one of clauses 10-12 further comprising sending an indication to a network node from that the UE is capable of decoding the JCS symbol as a downlink (DL) communication symbol.

Clause 14. The method of clause 13 further comprising including, in the indication, information indicative of: a buffering capability of the UE, a capability of the UE to support a different SCS within an OFDM slot, or a fast Fourier transform (FFT) size supported by the UE, or any combination thereof.

Clause 15. The method of any one of clauses 13-14 wherein the network node comprises the NTN platform.

Clause 16. The method of any one of clauses 10-15 further comprising receiving a configuration defining a sensing receive window, occurring after transmission of the RF signals, during which the UE is not scheduled to perform any uplink (UL) transmissions.

Clause 17. A non-terrestrial network (NTN) platform for enabling joint communication and sensing (JCS) by an NTN, the NTN platform comprising: a transceiver; a memory; and one or more processors communicatively coupled with the transceiver and the memory, wherein the one or more processors are configured to: transmit, with the transceiver, radio frequency (RF) signals toward earth, the RF signals comprising an orthogonal frequency-division multiplexing (OFDM) waveform with a plurality of symbols including a JCS symbol and one or more non-JCS symbols, wherein: the RF signals are incident on an area of the earth defining a footprint, and a duration of a cyclic prefix (CP) of the JCS symbol is a function of a width of the footprint; and receive, with the transceiver, one or more reflections of the JCS symbol.

Clause 18. The NTN platform of clause 17, wherein the one or more processors are further configured to perform RF sensing with the one or more reflections.

Clause 19. The NTN platform of any one of clauses 17-18 wherein the one or more processors are configured to transmit the RF signals such that a duration of the JCS symbol is longer than a duration of the one or more non-JCS symbols.

Clause 20. The NTN platform of clause 19 wherein the one or more processors are further configured to zero-pad the JCS symbol such that the duration of the JCS symbol is an integer multiple of the duration of the one or more non-JCS symbols.

Clause 21. The NTN platform of any one of clauses 19-20 wherein the one or more processors are configured to transmit the RF signals such that the JCS symbol has a different sub-carrier spacing (SCS) than the one or more non-JCS symbols.

Clause 22. The NTN platform of any one of clauses 17-21 wherein the one or more processors are configured to transmit the JCS symbol responsive to the one or more processors receiving an indication from a user equipment (UE) that the UE is capable of decoding the JCS symbol as a downlink (DL) communication symbol.

Clause 23. The NTN platform of clause 22 wherein, to receive the indication, the one or more processors are configured to receive information indicative of a buffering capability of the UE, a capability of the UE to support a different SCS within an OFDM slot, or a fast Fourier transform (FFT) size supported by the UE, or any combination thereof.

Clause 24. The NTN platform of any one of clauses 22-23 wherein the one or more processors are further configured to communicate a CP length configuration to the UE.

Clause 25. The NTN platform of any one of clauses 22-24 wherein the one or more processors are configured to receive the one or more reflections of the JCS symbol during a sensing receive window during which no uplink (UL) transmissions by the UE are scheduled.

Clause 26. The NTN platform of any one of clauses 22-25 wherein the one or more processors are further configured to receive a configuration defining a sensing receive window, occurring after transmission of the RF signals, during which the UE is not scheduled to perform any uplink (UL) transmissions.

Clause 27. A user equipment (UE) for enabling joint communication and sensing (JCS) by a non-terrestrial network (NTN), the UE comprising: a transceiver; a memory; and one or more processors communicatively coupled with the transceiver and the memory, wherein the one or more processors are configured to: receive, via the transceiver from an NTN platform, radio frequency (RF) signals comprising an orthogonal frequency-division multiplexing (OFDM) waveform with a plurality of symbols including a JCS symbol and one or more non-JCS symbols, wherein: the RF signals are incident on an area of the earth defining a footprint, and a duration of a cyclic prefix (CP) of the JCS symbol is a function of a width of the footprint; and decode the JCS symbol as a downlink (DL) communication symbol.

Clause 28. The UE of clause 27, wherein the one or more processors are further configured to receive, prior to receiving the RF signals, a configuration indicating a duration of the JCS symbol is longer than a duration of the one or more non-JCS symbols.

Clause 29. The UE of clause 28 wherein the one or more processors are further configured to receive, in the configuration, an indication the JCS symbol has a different sub-carrier spacing (SCS) than the one or more non-JCS symbols.

Clause 30. The UE of any one of clauses 27-29 wherein the one or more processors are further configured to send an indication to a network node from that the UE is capable of decoding the JCS symbol as a downlink (DL) communication symbol.

Clause 31. An apparatus having means for performing the method of any one of clauses 1-30.

Clause 32. A non-transitory computer-readable medium storing instructions, the instructions comprising code for performing the method of any one of clauses 1-30.

What is claimed is:

1. A method of enabling joint communication and sensing (JCS) by a non-terrestrial network (NTN), the method comprising:
    transmitting, with an NTN platform, radio frequency (RF) signals toward earth, the RF signals comprising an orthogonal frequency-division multiplexing (OFDM) waveform with a plurality of symbols including a JCS symbol and one or more non-JCS symbols, wherein:
        the RF signals are incident on an area of the earth defining a footprint, and
        a duration of a cyclic prefix (CP) of the JCS symbol is a function of a width of the footprint; and
    receiving, at the NTN platform, one or more reflections of the JCS symbol.

2. The method of claim 1, further comprising performing RF sensing with the one or more reflections.

3. The method of claim 1, wherein a duration of the JCS symbol is longer than a duration of the one or more non-JCS symbols.

4. The method of claim 3, further comprising zero-padding the JCS symbol such that the duration of the JCS symbol is an integer multiple of the duration of the one or more non-JCS symbols.

5. The method of claim 3, wherein the JCS symbol has a different sub-carrier spacing (SCS) than the one or more non-JCS symbols.

6. The method of claim 1, wherein transmitting the JCS symbol is responsive to receiving an indication from a user equipment (UE) that the UE is capable of decoding the JCS symbol as a downlink (DL) communication symbol.

7. The method of claim 6, wherein the indication includes information indicative of:
    a buffering capability of the UE,
    a capability of the UE to support a different SCS within an OFDM slot, or
    a fast Fourier transform (FFT) size supported by the UE, or any combination thereof.

8. The method of claim 6, further comprising communicating a CP length configuration to the UE.

9. The method of claim 6, wherein receiving the one or more reflections of the JCS symbol occurs during a sensing receive window during which no uplink (UL) transmissions by the UE are scheduled.

10. A method of enabling joint communication and sensing (JCS) by a non-terrestrial network (NTN), the method comprising:
    receiving, at a user equipment (UE) from an NTN platform, radio frequency (RF) signals comprising an orthogonal frequency-division multiplexing (OFDM) waveform with a plurality of symbols including a JCS symbol and one or more non-JCS symbols, wherein:
        the RF signals are incident on an area of the earth defining a footprint, and
        a duration of a cyclic prefix (CP) of the JCS symbol is a function of a width of the footprint of the RF signals; and
    decoding the JCS symbol as a downlink (DL) communication symbol.

11. The method of claim 10, further comprising receiving, prior to receiving the RF signals, a configuration indicating a duration of the JCS symbol is longer than a duration of the one or more non-JCS symbols.

12. The method of claim 11, wherein the configuration indicates the JCS symbol has a different sub-carrier spacing (SCS) than the one or more non-JCS symbols.

13. The method of claim 10, further comprising sending an indication to a network node from that the UE is capable of decoding the JCS symbol as a downlink (DL) communication symbol.

14. The method of claim 13, further comprising including, in the indication, information indicative of:
    a buffering capability of the UE,
    a capability of the UE to support a different SCS within an OFDM slot, or
    a fast Fourier transform (FFT) size supported by the UE, or any combination thereof.

15. The method of claim 13, wherein the network node comprises the NTN platform.

16. The method of claim 10, further comprising receiving a configuration defining a sensing receive window, occurring after transmission of the RF signals, during which the UE is not scheduled to perform any uplink (UL) transmissions.

17. A non-terrestrial network (NTN) platform for enabling joint communication and sensing (JCS) by an NTN, the NTN platform comprising:
    a transceiver;
    a memory; and
    one or more processors communicatively coupled with the transceiver and the memory, wherein the one or more processors are configured to:
        transmit, with the transceiver, radio frequency (RF) signals toward earth, the RF signals comprising an orthogonal frequency-division multiplexing (OFDM) waveform with a plurality of symbols including a JCS symbol and one or more non-JCS symbols, wherein:
            the RF signals are incident on an area of the earth defining a footprint, and
            a duration of a cyclic prefix (CP) of the JCS symbol is a function of a width of the footprint; and
        receive, with the transceiver, one or more reflections of the JCS symbol.

18. The NTN platform of claim 17, wherein the one or more processors are further configured to perform RF sensing with the one or more reflections.

19. The NTN platform of claim 17, wherein the one or more processors are configured to transmit the RF signals such that a duration of the JCS symbol is longer than a duration of the one or more non-JCS symbols.

20. The NTN platform of claim 19, wherein the one or more processors are further configured to zero-pad the JCS symbol such that the duration of the JCS symbol is an integer multiple of the duration of the one or more non-JCS symbols.

21. The NTN platform of claim 19, wherein the one or more processors are configured to transmit the RF signals such that the JCS symbol has a different sub-carrier spacing (SCS) than the one or more non-JCS symbols.

22. The NTN platform of claim 17, wherein the one or more processors are configured to transmit the JCS symbol responsive to the one or more processors receiving an indication from a user equipment (UE) that the UE is capable of decoding the JCS symbol as a downlink (DL) communication symbol.

23. The NTN platform of claim 22, wherein, to receive the indication, the one or more processors are configured to receive information indicative of:
   a buffering capability of the UE,
   a capability of the UE to support a different SCS within an OFDM slot, or
   a fast Fourier transform (FFT) size supported by the UE, or any combination thereof.

24. The NTN platform of claim 22, wherein the one or more processors are further configured to communicate a CP length configuration to the UE.

25. The NTN platform of claim 22, wherein the one or more processors are configured to receive the one or more reflections of the JCS symbol during a sensing receive window during which no uplink (UL) transmissions by the UE are scheduled.

26. The NTN platform of claim 22, wherein the one or more processors are further configured to receive a configuration defining a sensing receive window, occurring after transmission of the RF signals, during which the UE is not scheduled to perform any uplink (UL) transmissions.

27. A user equipment (UE) for enabling joint communication and sensing (JCS) by a non-terrestrial network (NTN), the UE comprising:
   a transceiver;
   a memory; and
   one or more processors communicatively coupled with the transceiver and the memory, wherein the one or more processors are configured to:
      receive, via the transceiver from an NTN platform, radio frequency (RF) signals comprising an orthogonal frequency-division multiplexing (OFDM) waveform with a plurality of symbols including a JCS symbol and one or more non-JCS symbols, wherein:
         the RF signals are incident on an area of the earth defining a footprint, and
         a duration of a cyclic prefix (CP) of the JCS symbol is a function of a width of the footprint; and
      decode the JCS symbol as a downlink (DL) communication symbol.

28. The UE of claim 27, wherein the one or more processors are further configured to receive, prior to receiving the RF signals, a configuration indicating a duration of the JCS symbol is longer than a duration of the one or more non-JCS symbols.

29. The UE of claim 28, wherein the one or more processors are further configured to receive, in the configuration, an indication the JCS symbol has a different sub-carrier spacing (SCS) than the one or more non-JCS symbols.

30. The UE of claim 27, wherein the one or more processors are further configured to send an indication to a network node from that the UE is capable of decoding the JCS symbol as a downlink (DL) communication symbol.

* * * * *